Nov. 6, 1923.  1,472,927
F. H. McLAIN
WOOD DRILLING LATHE
Filed June 30, 1922    2 Sheets-Sheet 1

Inventor.
Frank H. McLain

Nov. 6, 1923.  1,472,927
F. H. McLAIN
WOOD DRILLING LATHE
Filed June 30, 1922   2 Sheets-Sheet 2

Inventor:
Frank H. McLain

Patented Nov. 6, 1923.

1,472,927

UNITED STATES PATENT OFFICE.

FRANK H. McLAIN, OF PORTLAND, MAINE.

WOOD-DRILLING LATHE.

Application filed June 30, 1922. Serial No. 571,963.

*To all whom it may concern:*

Be it known that I, FRANK H. MCLAIN, a citizen of the United States, residing at Portland, in the county of Cumberland and State of Maine, have invented a new and useful Wood-Drilling Lathe, of which the following is a specification.

My invention relates to improvements in wood drilling lathes, and more especially and particularly to those parts which are concerned in the "chucking" and feeding of the work to the drill or boring tool. In performing certain operations in the wood novelty business speed is an essential factor, and drilling the holes in the ends of handles or other turned products of all sizes and designs is one of those operations.

In most lathes designed to do this work the operator grips the material or stock to be drilled with his left hand and feeds the work forward on to the drill by operating the fixed tail-stock with his right hand. It is slow and tedious work and not conducive to economical production.

In my design the operator uses his left hand simply and only to keep the lathe supplied with undrilled stock and his right hand is occupied in handling the levers which manipulate the combined chuck and feed mechanism.

Figures 3, 4:
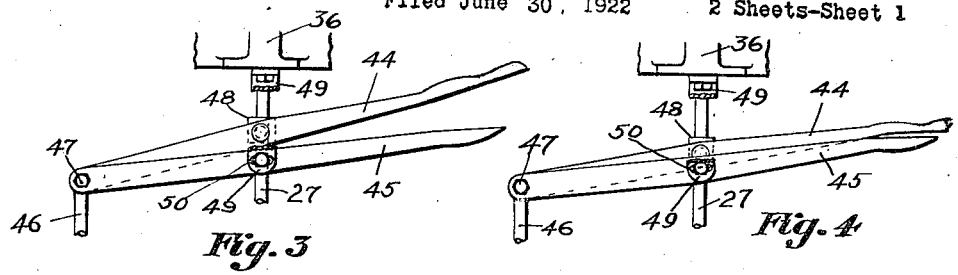
Figure 1:
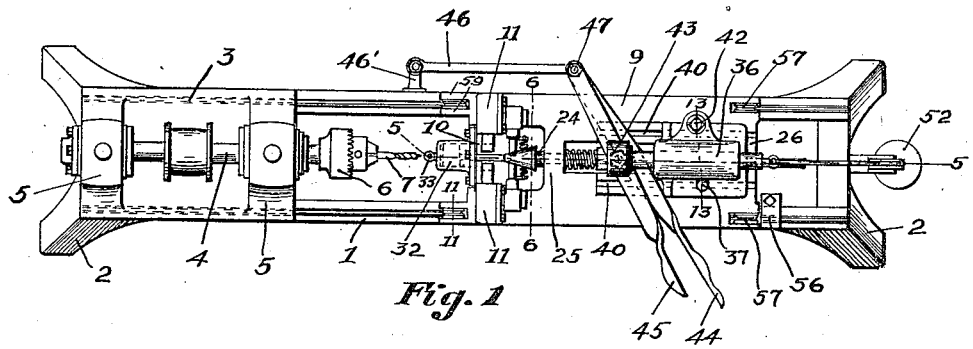
Figure 2:
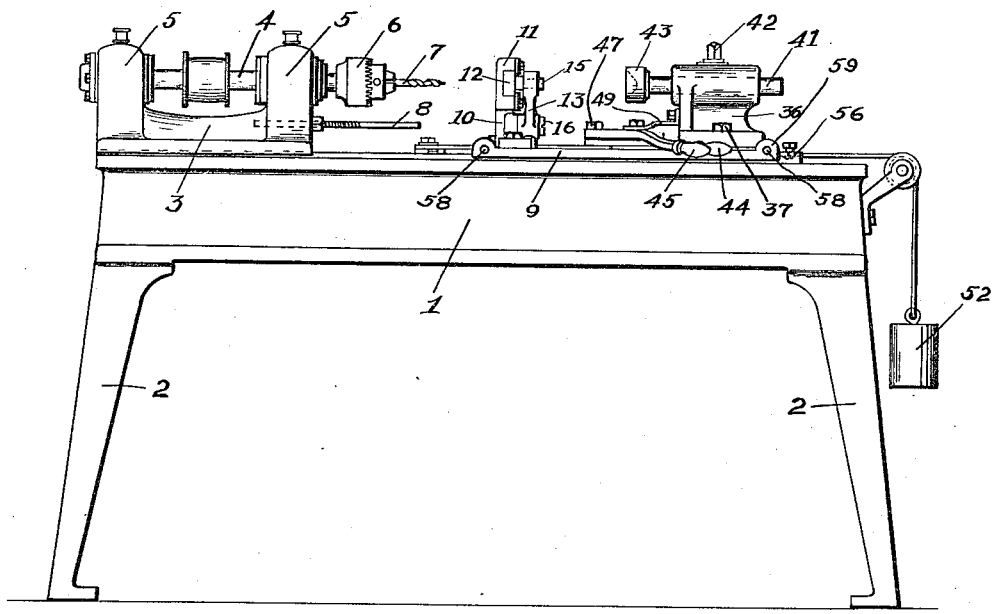
Figure 5:
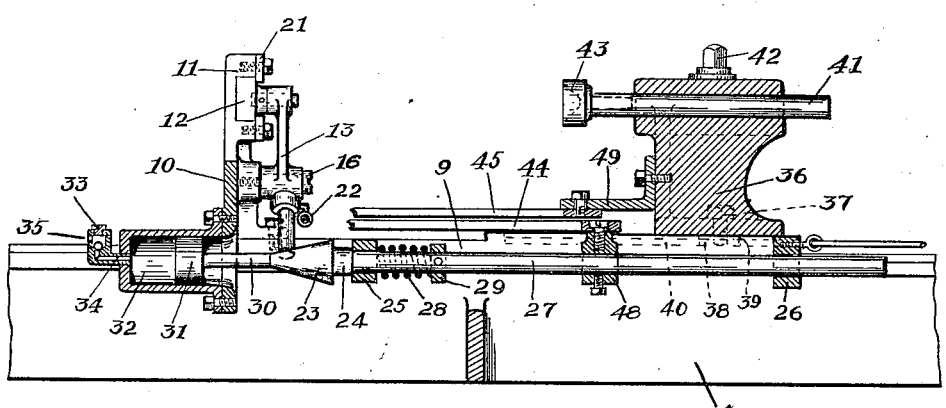
Figure 6:
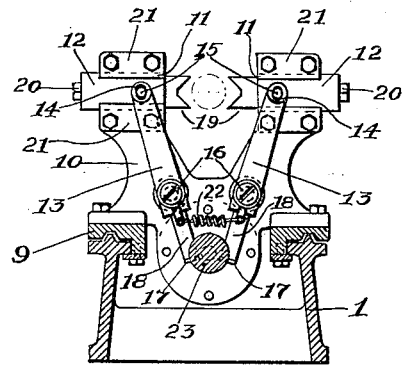
Figure 9:
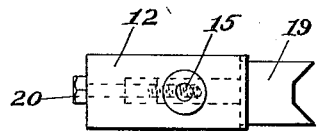
Figure 10:
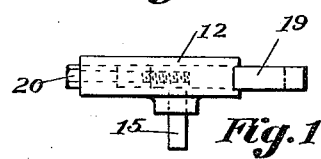
Figure 7:
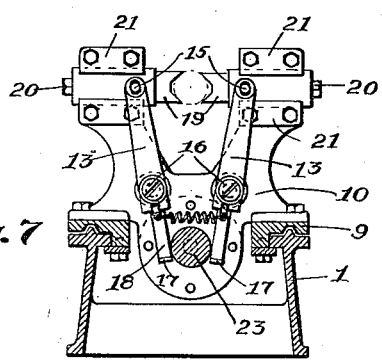
Figure 11:
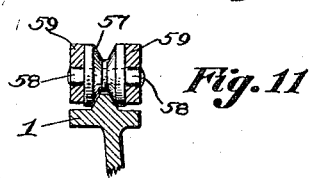
Figure 12:
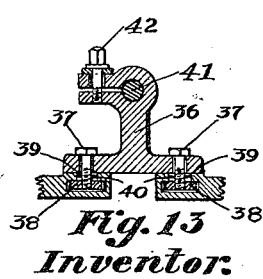
Figure 13:
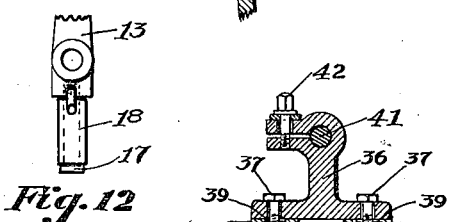
Figure 8:
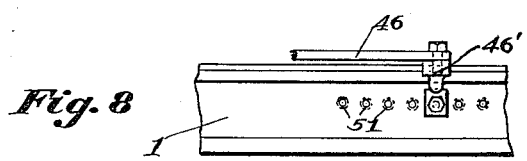

In the drawings accompanying this specification I have illustrated my new lathe in all its details which pertain to the new and novel features of same. In these drawings Fig. 1 is a plan view of the lathe; Fig. 2 is a front side elevation; Fig. 3 represents one position of the feed levers, in plan view; Fig. 4 another plan view of the feed levers; Fig. 5 is a longitudinal sectional elevation through bed and carriage, with chuck parts and tail-stock mounted thereon, and taken on line 5—5, Fig. 1; Fig. 6 is a cross sectional view through bed and carriage taken on line 6—6, Fig. 1, showing chuck jaws open; Fig. 7 the same as Fig. 6. but with chuck jaws closed over work; Fig. 8 is a back side view of bed, showing method of adjusting lever link for different positions of carriage on bed of lathe; Fig. 9 is a detail, in elevation, of the chuck jaw and slide; Fig. 10 is a plan view of chuck jaw and slide; Fig. 11 is a section through carriage truck or wheel bearing, taken on line 11—11, Fig. 1; Fig. 12 is a view of lower end of chuck lever, showing roll, and Fig. 13 a cross section through tail-stock taken on line 13—13, Fig. 1.

Similar numerals refer to similar parts throughout the several views.

1 is the bed, so called, of the lathe, mounted on legs 2, 2. At one end of the bed is a head-stock, 3, in which runs spindle 4, through housings 5, 5, containing bearings for said spindle. The bearings may be of the ball type or the old conventional solid design, although I prefer, and am using the ball bearing design. On the inner end of spindle 4 is mounted chuck 6, carrying drill 7. At 8 is seen an adjustable stop to regulate the depth of hole to be drilled in the stock, the carriage in its forward movement abutting on the end of said stop. 9 is a carriage slidably mounted on grooved trucks or wheels and adapted to travel forward and backward on the V's on said bed.

Rigidly secured to forward end, and on top, of said carriage is a chuck frame 10, its upper portion divided and forming bearings 11, 11, for chuck slides 12, 12. These chuck slides are actuated by chuck levers 13, 13, having elongated holes 14, 14, registering over pins 15, 15, in chuck slides. Chuck levers are pivoted over pins 16, 16, and have extensions on their lower ends consisting of pins 17, 17, over which revolves sleeves 18, 18. Extending from chuck slides toward center line of lathe are chuck jaws 19, 19, with notched faces and with shanks extending into slides and secured thereto by bolts 20, 20. It will also be noticed by referring to Figs. 9 and 10 that the body of chuck jaws are set slightly into slide to prevent turning and to obtain proper alignment. Suitable gibs, 21, 21 confine chuck slides properly within their bearings. Connecting the two chuck levers, below pivot pins 16, 16, is a helical spring 22, the tension of which keeps the chuck jaws normally open.

Referring to Fig. 5, at 23, is seen a cone shaped member, with hub 24 shouldering on bearing 25, which latter is one of the two cross tie members of carriage, and with the other cross tie member 26, serve as bearings for feed shaft 27, which shaft is integral with said cone 23. It will thus be seen that bearing 25 restricts the backward movement of cone 23, and that by means of the helical spring 28 the shoulder of 24 is normally held in contact with bearing 25. An abutting collar 29 serves as a restraining means for one end of spring 28.

Extending forwardly from cone 23, the connecting shaft 30 terminates in a piston 31, operating in a cylinder 32. At the extreme forward end of this cylinder is seen a check valve 33, with passage 34 in communication with the interior of the cylinder and port 35 opening directly to the atmosphere. At the rearward end of carriage is mounted a tail-stock, with body 36 adjustably secured to carriage by bolts 37, nuts, operating in T slots, 38, and guiding strips 39 fitting closely slots 40 in carriage and establishing accurate alignment to tail-stock when adjusted to different positions along the central line of carriage. 41 is the tail-stock spindle, adjustably secured to tail-stock by means of clamp bolt 42. Proper "centers," as seen at 43 provide means for holding in alignment one end of the stock being drilled.

In Figs. 3 and 4 are seen the arrangement of feed levers, the former showing the feed shaft in its normal position on carriage and the latter the position of feed shaft after it has been moved in a forward direction, which movement results in the cone 23 being moved forward and forced between the downwardly extending ends of chuck levers 18, 18, spreading the latter until chuck jaws 19, 19, close over the work to be drilled (see Fig. 7).

It will thus be observed that the movement of cone 23 in the carriage is controlled and restricted by the size of the work or stock which is inserted between the chuck jaws in the operation of drilling, as the arms 18, 18 can swing apart no farther than the position they assume when chuck jaws bring up on the stock being operated on. It will also be noted that a very accurate centering mechanism is obtained by this combination, and to overcome the difficulty of too great a variation of movements of the cone, incidental to the extremes in sizes of stock to be held in these chuck jaws, I provide a set of jaws of variable lengths, so that, whether large or small size stock is being drilled, the movement of cone remains practically constant. It must be understood, of course, that but one size, of the several in a set of these jaws, can be used at one time,—a change to other sizes being made as required.

Again referring to Figs. 3 and 4, 44 is the cone feed lever and 45 is the tail stock lever. Both levers fulcrum on link bar 46 at fulcrum pin 47. Adjustably secured to feed shaft 27 is collar 48, and cone feed lever 44 is pivoted on the top of this collar. Rigidly secured to, and extending out from, tail-stock is a bracket 49 to which tail-stock lever 45 is pivoted through elongated hole 50 in said bracket, said elongation allowing for different arcs in which the two levers swing.

By operating lever 45 the carriage 9, and all parts mounted thereon, may be moved backward and forward on lathe bed without action of the parts composing the centering and chucking mechanism. The co-relation of parts under this condition may be seen in Figs. 1, 2, 3, 5 and 6. If, however, the cone feed lever 44 is first brought into position as seen in Fig. 4, this action forces the cone 23 forward and brings chuck jaws rigidly around the stock to be drilled, and then by gripping the handles of both levers and operating them as one, perfect control of the feed of stock to the drill, as well as control of grip of stock in chuck jaws is attained.

A point I wish to enlarge on in this feed is that by a correct adjustment of collar 48 on feed shaft 27, whereby the handles of the two levers 44 and 45 cannot quite abut one on the other, a variable pressure can be brought to bear on the chuck jaws holding the stock, depending on the strength of grip applied to the handles by the operator. This is very important in cases where large holes are to be drilled and when on account of dull drills or bits, or the condition of the stock, there is considerable friction generated between the drill and stock with consequent danger of the stock slipping and revolving in the jaws. Then it often happens when the work is backed off the drill that the latter will clog and offer considerable resistance, tending to spin the work with the drill, but by the operator's complete control over the pressure applied to jaws he can regulate the pressure according to the circumstances governing the situation. Thus by the operator's being able to manipulate the mechanism wholly with his right hand, his left is free to attend to the feeding of new pieces to the chuck, with a consequent saving of much time.

I have provided means for taking care of different lengths of stock to be drilled by having the tail-stock adjustable along the top of carriage and by the tail-stock spindle adjustment. When these adjustments are made it requires a different position of collar 48 along the feed shaft 27; also another location for the link bar 46 and its connecting post 46', which latter can be adjusted along the series of holes 51, seen on the back side of bed of lathe and illustrated in Fig. 8. While I may mount the carriage on the bed using the conventional V tongue and groove construction, I prefer to use, as I have shown in Fig. 11, V grooved wheels supported in bearings on the carriage and rolling over V tongues on the bed, the grooved wheel 57 supported on journals 58, 58, and revolving between ears 59, 59, which are extensions of the bed. The wheels fit closely between these ears.

Now in the foregoing I have described the lathe equipped with my double lever feed and chuck control. I may elect, however, to eliminate certain parts in operating the lathe when doing a certain class of work, as for instance,—drilling very small holes, although all parts will remain intact and easily and quickly made operative. In this latter work I am not obliged to have so strong a grip on the stock and can utilize parts already mentioned, but whose functions have not been stated. I refer to the dash-pot, which may not necessarily be used in the first mentioned and described method of operation, consisting of piston 31, cylinder 32 and check valve 33; also weight 52 with its connecting members. By loosening collar 29 I throw out of commission spring 28 and use lever 44, which may be extended somewhat longer than lever 45, exclusively. The weight to return carriage is applicable to both methods of operation. In the case of the dash-pot, which, on the return of lever 44 to its normal position moves piston 31 toward the tail-stock end of cylinder 32 and creates a partial vacuum in said cylinder, supplying a power on return of feed shaft assisting the closing of chuck jaws, I lighten the work of the operator. It will be understood that the carriage must come to the stop 56 on the bed of lathe before the chuck jaws will have been fully opened.

Having thus described my invention, I claim:

1. In a wood drilling lathe, the combination, with a bed, a head-stock and a tool carrying spindle mounted within said head-stock, of a slidable carriage, a tail-stock mounted on the rearward end of said carriage, a chucking mechanism mounted on the forward end of said carriage, actuating means for operating said carriage with said chucking and said tail-stock members conjunctively, backward and forward on said lathe bed, to and from the drilling or boring tool in said spindle, and means for independently varying the pressure of chuck jaws around the material being operated on, before, during and subsequent to the drilling or boring operation, under the control and at the will of the operator.

2. In a wood drilling lathe, the combination, with a bed, a headstock, a spindle mounted in said head-stock and carrying a drilling or boring tool, of a slidably mounted carriage adapted to traverse a certain portion of the top of said bed, a tail-stock adjustably mounted on the rearward end of said carriage, a bufurcated chuck carrying member mounted on the forward end of said carriage, each bifurcation, of said bifurcated member, provided with a slidable member adapted to grasp and hold material, inserted between the two, firmly and centrally and in line with axis of said head-stock spindle, and actuating means for operating said chuck members.

3. In a wood drilling lathe, the combination, with a bed, a head-stock provided with a tool carrying spindle, of a slidably mounted carriage adapted to traverse the rearward part of the top of said lathe bed, a tail-stock adjustably mounted on rearward end of said carriage, an adjustably mounted spindle in said tail-stock with proper centering devices to accurately align the rearward end of material being drilled with axis of drilling spindle, a bifurcated chuck carrying member fixedly mounted on forward end of carriage, each bifurcation provided with sliding chuck jaw members carrying chuck jaws and adapted, when forced toward one another, to centrally hold and grip material placed therein, said chuck jaw members each connected with and actuated by swinging members fulcrumed at or near the center of their lengths on said bifurcated member, the upper ends connecting with the chuck jaw members and the lower ends of said swinging members impinging on a cone shaped member, integral with a feed shaft slidably mounted in said carriage, and adapted, when moved forwardly, to force the lower ends of said swinging members apart thereby bringing their upper portions (above the fulcrum point) nearer the center line or axis of spindle, a feed lever fulcrumed on bed of lathe and pivotally connected to said feed shaft, whereby movement may be given to said shaft, and, through said cone member and swinging members, movement to chuck members, and when material is gripped between the jaws of said chuck members, also movement to carriage.

4. In a wood drilling lathe, the combination, with a bed, a headstock and a tool carrying spindle, of a slidably mounted carriage adapted to move freely upon said bed, an adjustably mounted tail-stock on said carriage, a tail-stock spindle carrying centering devices adjustably mounted in said tail-stock, a centering and chucking device mounted on said carriage, a feed shaft mounted in bearings in said carriage and adapted to move endwise, a cone shaped member integral with said shaft, a lever fulcrumed on the lathe, and pivotally attached to said shaft, whereby movement may be given said shaft and said cone, which latter is adapted to engage swinging chuck operating members and provide a means for quickly closing or opening the jaws in said chucking device, a second lever, fulcrumed on the same pin as the lever first mentioned, pivotally attached to said tail-stock, said second lever providing means for moving the carriage, with the several parts mounted thereon, backward and forward on bed of lathe without action or operation of the chucking device, both of said levers to be so positioned that their handles may be brought quite closely together and actuated as one lever, sufficient space being left between the two handles, however, so that when an extra or abnormal pressure is required to hold the material in the chuck there will still be left space to further bring them toward one another, without contacting, by the application of a stronger grip on the handles by, and at the will of, the operator, a spring acting on the feed shaft to normally hold the cone out of direct action with the swinging chuck operating members, an adjustable stop to provide means for limiting movement of carriage in its forward movement and regulate depth of hole drilled, and a stop to limit movement of carriage rearward.

5. In a wood drilling lathe, the combination, with a bed, a head-stock and a tool carrying spindle in said headstock, of a slidably mounted carriage traveling on the bed of the lathe, a tail-stock adjustably secured to said carriage, a centering and chucking mechanism mounted fixedly on said carriage, a feed shaft movable lengthwise in bearings in said carriage and integral with a cone shaped member, said cone shaped member adapted to actuate the parts in said chucking mechanism, a lever to actuate said shaft, a piston, integral with said shaft, operating in a cylinder secured to said carriage, said piston and cylinder providing means to assist in the return of the cone shaped member to close the chuck on the forward stroke of said shaft, a suspended weight connected to the carriage through proper means to assist in the return of the carriage to normal or rearward position, a stop to limit the forward movement of carriage and regulate the depth of hole to be drilled, and a stop to limit the rearward movement of carriage, all substantially as described.

FRANK H. McLAIN.